(12) United States Patent
Pan

(10) Patent No.: US 7,586,669 B2
(45) Date of Patent: Sep. 8, 2009

(54) NON-CONTACT MICRO MIRRORS

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 84 days.

(21) Appl. No.: 11/553,886

(22) Filed: Oct. 27, 2006

(65) Prior Publication Data

US 2008/0100897 A1    May 1, 2008

(51) Int. Cl.
G02B 26/00 (2006.01)
G02B 26/08 (2006.01)

(52) U.S. Cl. .................. 359/290; 359/198; 359/225

(58) Field of Classification Search .......... 359/198, 359/224, 225, 290, 295, 298
See application file for complete search history.

(56) References Cited

U.S. PATENT DOCUMENTS

| | | | |
|---|---|---|---|
| 4,626,941 A | | 12/1986 | Sawada et al. |
| 4,879,092 A | | 11/1989 | Huang |
| 5,061,049 A | * | 10/1991 | Hornbeck ............ 359/224 |
| 5,122,339 A | | 6/1992 | Pickens et al. |
| 5,504,614 A | | 4/1996 | Webb et al. |
| 5,661,591 A | | 8/1997 | Lin et al. |
| 5,933,365 A | | 8/1999 | Klersy et al. |
| 5,942,054 A | | 8/1999 | Tregilgas et al. |
| 6,337,760 B1 | | 1/2002 | Huibers et al. |
| 6,657,759 B2 | * | 12/2003 | Muller ............ 359/198 |
| 6,914,711 B2 | | 7/2005 | Novotny et al. |
| 6,992,810 B2 | | 1/2006 | Pan et al. |
| 7,167,298 B2 | | 1/2007 | Pan |
| 7,199,917 B2 | * | 4/2007 | Gong et al. ............ 359/291 |
| 2004/0085615 A1 | | 5/2004 | Hill et al. |
| 2004/0218154 A1 | | 11/2004 | Huibers |
| 2005/0128564 A1 | | 6/2005 | Pan |
| 2006/0087717 A1 | | 4/2006 | McGinley et al. |
| 2007/0018261 A1 | | 1/2007 | Doan |
| 2007/0041078 A1 | | 2/2007 | Pan |

FOREIGN PATENT DOCUMENTS

| | | |
|---|---|---|
| EP | 0 848 264 | 6/1998 |
| EP | 0 848 265 A2 | 6/1998 |
| EP | 1 416 311 A1 | 5/2004 |

(Continued)

OTHER PUBLICATIONS

Shaoher X. Pan, "Spatial Light Modulator Multi-layer Mirror Plate", U.S. Appl. No. 11/470,568, filed Sep. 6, 2006, 42 pp.

(Continued)

Primary Examiner—William C Choi
(74) Attorney, Agent, or Firm—Fish & Richardson P.C.

(57) ABSTRACT

A micro mirror device includes a hinge supported by a substrate and a mirror plate tiltable around the hinge. The hinge is configured to produce an elastic restoring force on the mirror plate when the mirror plate is tilted away from an un-tilted position. The micro mirror device also includes a controller that can produce an electrostatic force to overcome the elastic restoring force to tilt the mirror plate from the un-tilted position to an "on" position or an "off" position. The electrostatic force can counter the elastic restoring force to hold the mirror plate at the "on" position or the "off" position.

28 Claims, 12 Drawing Sheets

FOREIGN PATENT DOCUMENTS

WO    WO 2005/043572    5/2005

OTHER PUBLICATIONS

Larry J. Hornbeck, "Digital Light Processing™ for High-Brightness, High-Resolution Applications", Feb. 10-12, 1997, San Jose, CA, pp. 1-14.

Final Office Action mailed Oct. 31, 2008, U.S. Application Serial No. 11/553,914, 9 pp.

Rosenband et al., "Self-propagating high-temperature synthesis of complex nitrides of intermetallics", Intermetallics, vol. 14, Issue 5, May 2006, pp. 551-559.

Shew B-Y et al., "Effects of r.f. bias and nitrogen flow rates on the reactive sputtering of TiAlN films", Thin Solid Films, Vol. 293, No. 1-2, Jan. 30, 1997, pp. 212-219.

* cited by examiner

NON-CONTACT MICRO MIRRORS

BACKGROUND

The present disclosure relates to the fabrication of micro mirrors.

A spatial light modulator (SLM) can be built with an array of tiltable mirror plates having reflective surfaces. Each mirror plate can be tilted by electrostatic forces to an "on" position and an "off" position. The electrostatic forces can be generated by electric potential differences between the mirror plate and one or more electrodes underneath the mirror plate. In the "on" position, the micro mirror plate can reflect incident light to form an image pixel in a display image. In the "off" position, the micro mirror plate directs incident light away from the display image.

SUMMARY

In one general aspect, the present invention relates to a micro mirror device that includes a hinge supported by a substrate; a mirror plate tiltable around the hinge, wherein the hinge is configured to produce an elastic restoring force on the mirror plate when the mirror plate is tilted; and a controller that can produce an electrostatic force to overcome the elastic restoring force to tilt the mirror plate from the un-tilted position to an "on" position or an "off" position. The electrostatic force is configured to counter the elastic restoring force to hold the mirror plate at the "on" position or the "off" position.

In another general aspect, the present invention relates to a micro mirror device that includes a hinge supported by a substrate, a mirror plate tiltable around the hinge, and a controller that can produce an electric signal to hold the mirror plate at a titled orientation at or above two degrees relative to the surface of the substrate without causing the mirror plate to contact any structure on the substrate other than the hinge. The hinge can be configured to elastically restore the mirror plate to be substantially parallel to the substrate from the tilted orientation.

In another general aspect, the present invention relates to a micro mirror device that includes a hinge supported by a substrate and a mirror plate tiltable around the hinge. The hinge can include a material selected from the group consisting of a titanium-nickel alloy having a titanium composition between about 30% to 70%, a titanium-aluminum alloy having a titanium composition between about 30% to 70%, an aluminum-copper alloy having a copper composition between about 5% to 20%, and an aluminum titanium nitride having a nitrogen composition in the range of 0to about 15%.

In another general aspect, the present invention relates to a method for controlling the tilt movement of a mirror plate. The method includes producing an electrostatic force on a mirror plate tiltable around a hinge supported by a substrate. The hinge can produce an elastic restoring force on the mirror plate when the mirror plate is tilted. The method also includes overcoming the elastic restoring force to tilt the mirror plate from an un-tilted position to an "on" position or an "off" position and holding the mirror plate at the "on" position or the "off" position in balance with the elastic restoring force.

Implementations of the system may include one or more of the following features. The orientation can be at or above three degrees relative to the surface of the substrate and the hinge is configured to elastically restore the mirror plate to be substantially parallel to the substrate from the tilted orientation. The orientation can be at or above four degrees relative to the surface of the substrate and the hinge can elastically restore the mirror plate to be substantially parallel to the substrate from the tilted orientation. The hinge can include an alloy selected from the group consisting of a titanium-nickel alloy having a titanium composition between about 30% to 70%, a titanium-aluminum alloy having a titanium composition between about 30% to 70%, an aluminum-copper alloy having a copper composition between about 5% to 20%, and a aluminum titanium nitride having a nitrogen composition in the range of about 0 to 15%. The hinge can include the aluminum titanium nitride. The aluminum and the titanium in the aluminum titanium nitride can have approximately equal compositions. The nitrogen composition in the aluminum titanium nitride can be in the range of 0 to about 10%. The hinge can include the titanium-nickel alloy. The titanium composition in the titanium-nickel alloy can be in the range of about 40% to 60%. The titanium composition in the titanium-nickel alloy can be in the range of about 45% to 55%. The hinge can include the titanium-aluminum alloy. The titanium composition in the titanium-aluminum alloy can be in the range of about 40% to 60%. The titanium composition in the titanium-aluminum alloy can be in the range of about 45% to 55%. The hinge can include the aluminum titanium nitride. The aluminum and the titanium in the aluminum titanium nitride can have approximately equal compositions. The nitrogen composition in the aluminum titanium nitride can be in the range of 0 to about 10%. The hinge can include the titanium-nickel alloy. The titanium composition in the titanium-nickel alloy can be in the range of about 40% to 60%. The titanium composition in the titanium-nickel alloy can be in the range of about 45% to 55%. The hinge can include the titanium-aluminum alloy. The titanium composition in the titanium-aluminum alloy can be in the range of about 40% to 60%. The titanium composition in the titanium-aluminum alloy can be in the range of about 45% to 55%. The hinge can elastically restore the mirror plate from a first orientation at or above two degrees relative, at or above three degrees relative or at or above four degrees relative to the surface of the substrate to a second orientation substantially parallel to the substrate. The micro mirror device can further include a controller configured to produce an electric signal to hold the mirror plate at an orientation at or above two degrees, at or above three degrees or at or above four degrees relative to the surface of the substrate.

Implementations may include one or more of the following advantages. The present specification discloses a simplified structure for a tiltable mirror plate on a substrate and methods for driving the tiltable mirror plate. The tiltable mirror plate can be tilted to and held at predetermined angles in response to electric signals provided by a controller. No mechanical stop is required on the substrate or on the mirror plate to stop the tilted mirror plate and define the tilt angles of the mirror plate. Eliminating mechanical stops can simplify a micro mirror device, when compared to some conventional micro mirror devices with mechanical stops. The lack of mechanical contact between the mirror plate and a structure, e.g., a mechanical stop, on the substrate, may also remove the problem of stiction that is known to exist between a mirror plate and mechanical stops in convention mirror devices. Mirror plate devices described herein may tilt to a narrower angle than mirror plates in conventional devices. Less mirror plate tilting can cause less strain on the hinge around which the mirror plate rotates. Such devices may be less likely to experience mechanical breakdown. Thus, the useful lifetime of the device may be longer. Further, because the hinge is not required to rotate as much as in conventional devices, a greater variety of materials may be selected for hinge formation. Moreover, because the mirror plate undergoes a smaller angular deflection, it can operate at higher frequencies.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
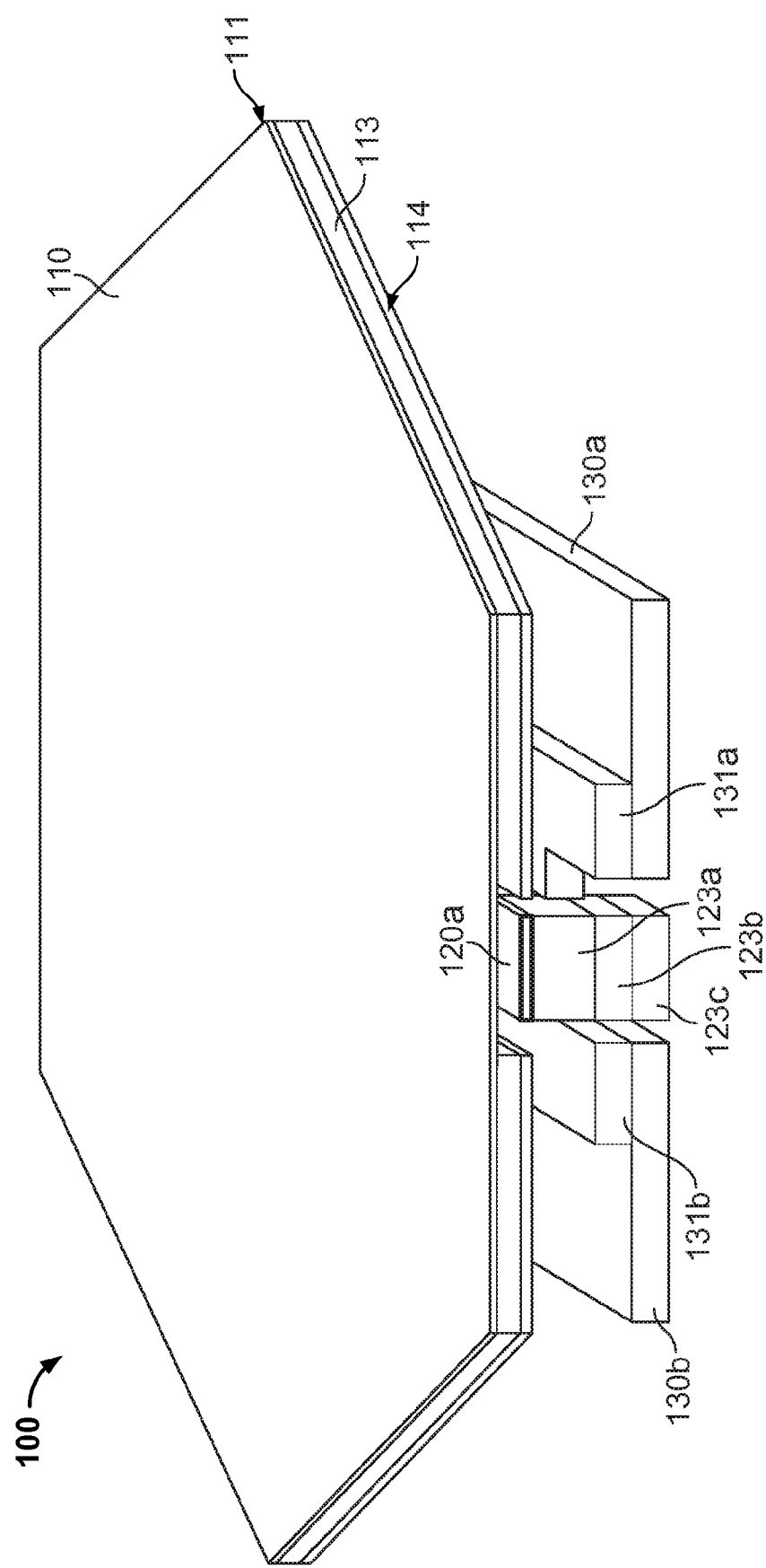
FIG. 1 is a perspective view of a micro mirror.
Figure 2:
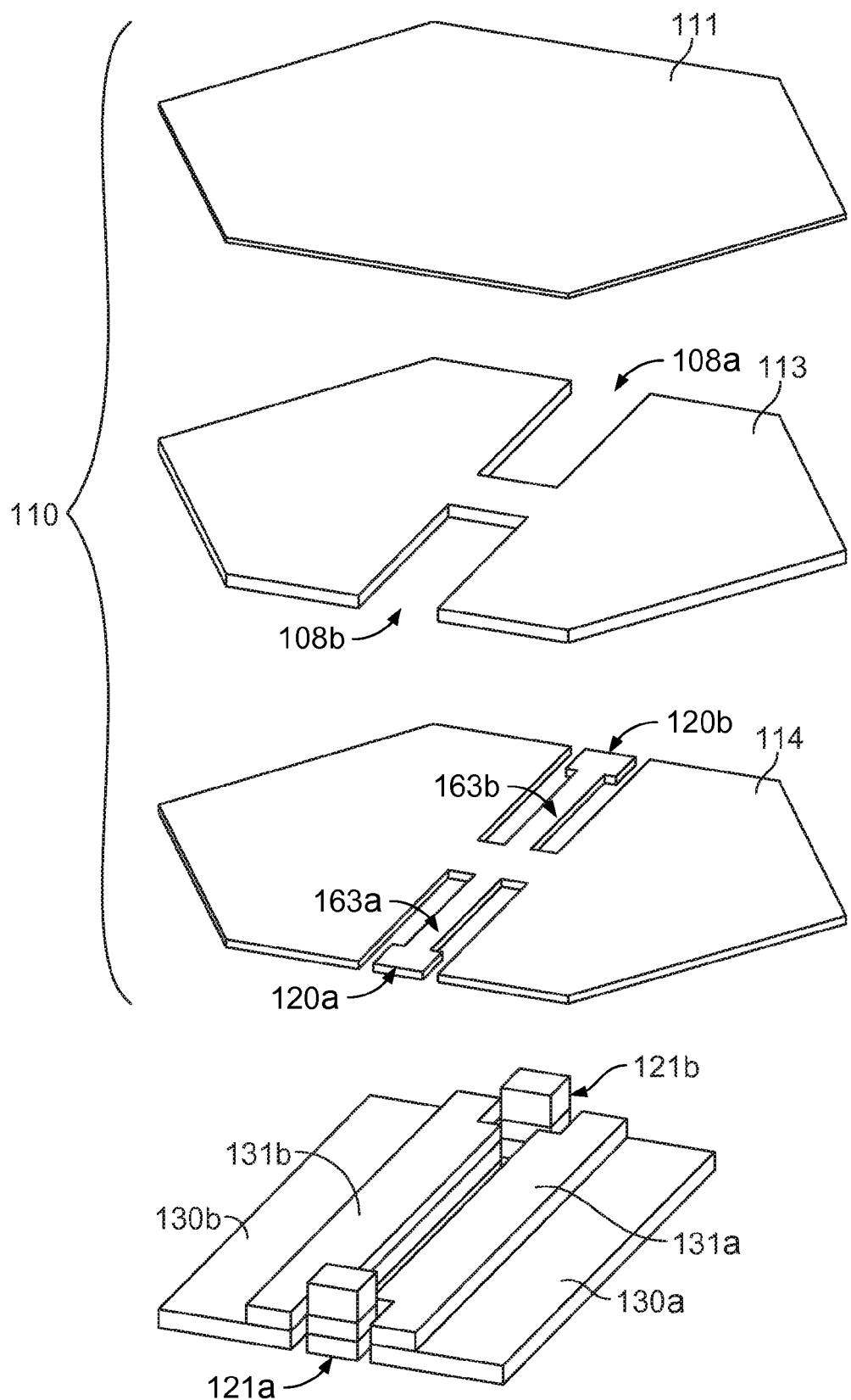
FIG. 2 is an expanded view of the micro mirror of FIG. 1.
Figure 3:
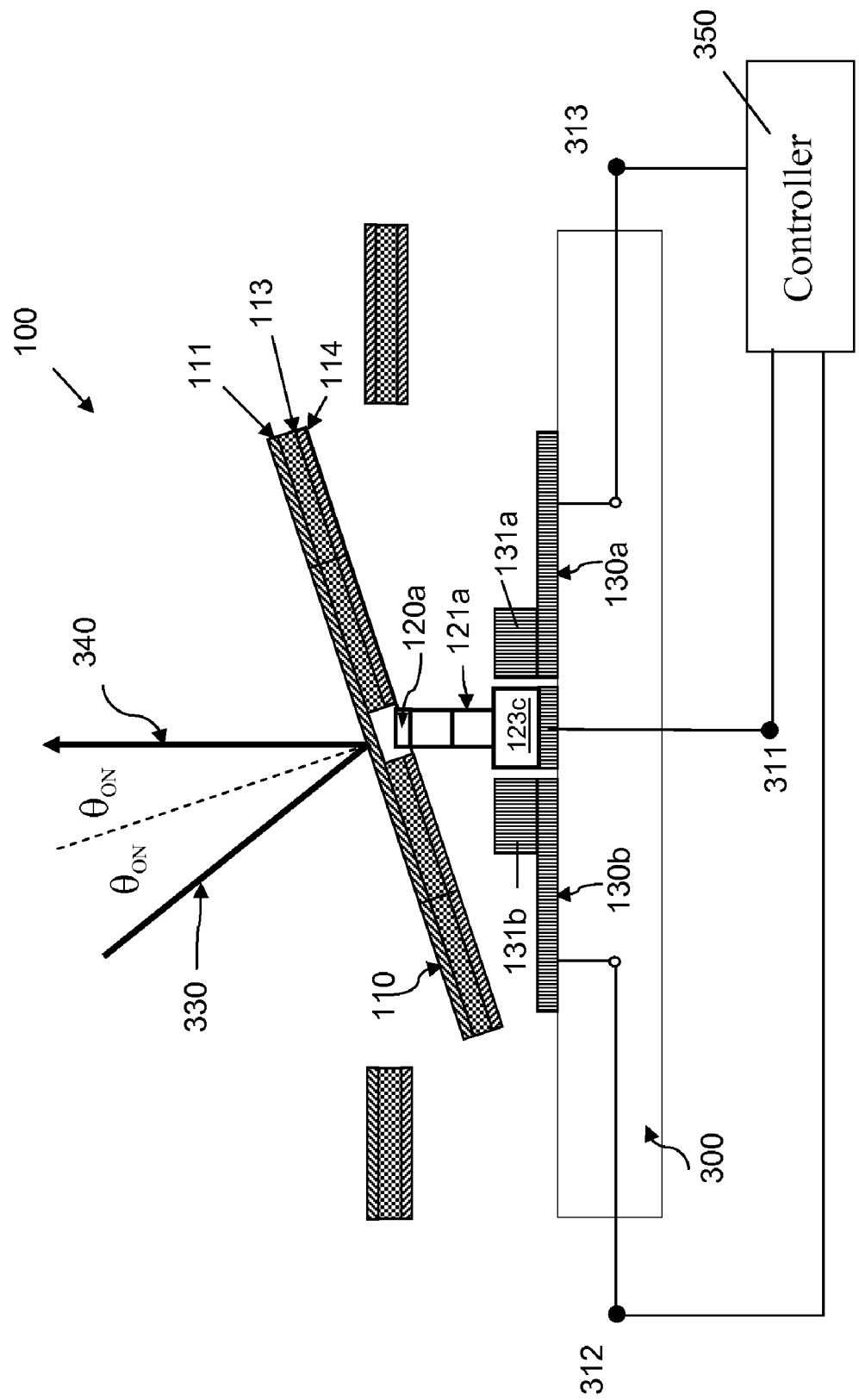
FIG. 3 is a side view of the micro mirror of FIG. 1.

Referring to FIGS. 1-3, a micro mirror 100 can include a mirror plate 110 over a substrate 300. The mirror plate 110 can include a reflective layer 111, a spacer layer 113, and a hinge layer 114. In some embodiments, the spacer layer 113 includes a pair of openings 108a and 108b. In some embodiments, the hinge layer 114 includes two hinge components 120a and 120b. The hinge components 120a and 120b are connected with the main portion of the hinge layer 114 by elongated hinges 163a and 163b respectively. The elongated hinges 163a and 163b are separated from the main portion of the hinge layer 114 by gaps on the two sides of the elongated hinges 163a or 163b. The mirror plate 110 is at an un-tilted position with an external force being applied to the mirror plate 110. The un-tilted position can be substantially parallel to the upper surface of the substrate. The mirror plate 110 can be tilted about an axis defined by the two hinge components 120a and 120b. One hinge component 120a (or 120b) is connected to a hinge support post 121a (or 121b) on the substrate 300. The hinge support post 121a can be formed by an unitary object, or include two or three portions. For example, the hinge support post 121a can include an upper portion 123a, a middle portion 123b, and a lower portion 123c that can be formed in separate deposition steps.

The micro mirror 100 can further include a two-part electrode with lower portion 130a and upper portion 131a on one side of the hinge support posts 121a, 121b, and another two-part electrode with lower portion 130b and upper portion 131b on another side of the hinge support posts 121a, 121b. The electrode lower portions 130a, 130b can be formed from one conductive layer. The electrode upper portions 131a, 131b can be formed from another conductive layer over the electrode lower portions 130a, 130b. The hinge support posts 121a, 121b are connected to a control line 311, the two-part electrode 130a, 131a is connected to a control line 312, and the two-part electrode 130b, 131b is connected to a control line 313. The electric potentials of the control lines 311, 312, 313 can be separately controlled by external electric signals provided by a controller 350. The potential difference between the mirror plate 110 and the two-part electrodes 130a, 131a or two-part electrodes 130b, 131b can produce an electrostatic torque that can tilt the mirror plate 110. Suitable micro mirror devices are described further in U.S. Publication No. 2005-0128564, "High Contrast Spatial Light Modulator and Method", filed Oct. 26, 2004, and U.S. application Ser. No. 11/470,568, "Spatial Light Modulator Multi-layer Mirror Plate" filed Sep. 6, 2006, which are incorporated by reference herein for all purposes.

Figure 4B:
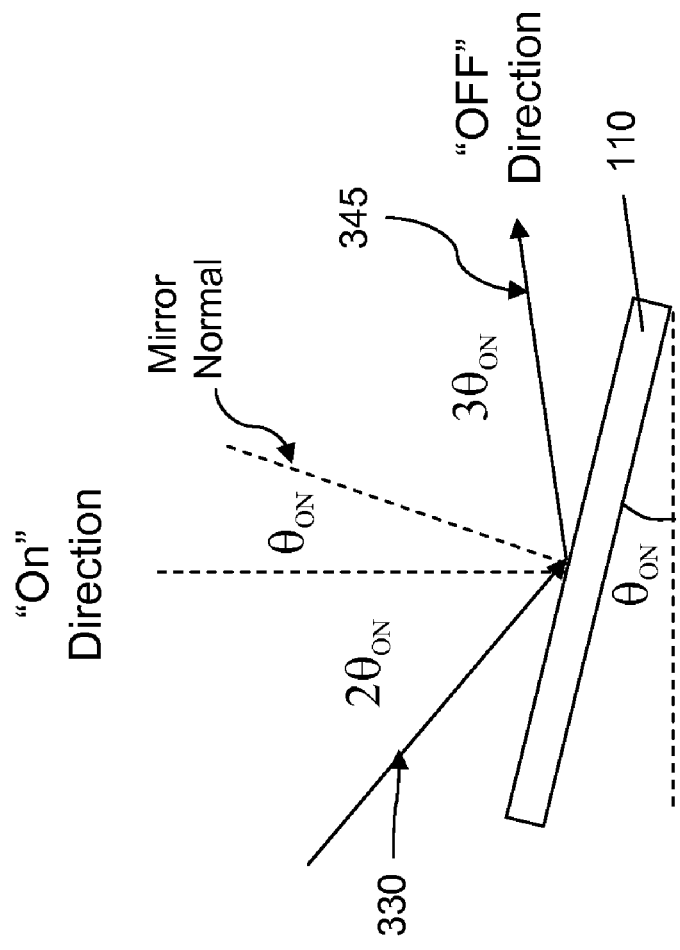
FIGS. 4A and 4B illustrate the reflections of incident light in the "on" direction and the "off" direction respectively by the tilted mirror plate.
Figure 4A:
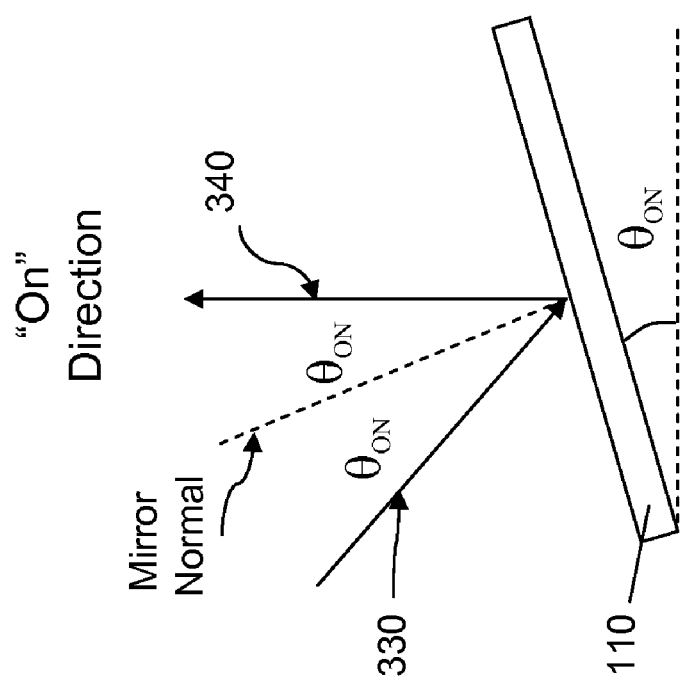

Referring to FIGS. 3 and 4A, the controller 350 can produce an electrostatic force to overcome an elastic restoring force produced by the distorted elongated hinges 163a or 163b to tilt the mirror plate from the un-tilted position to an "on" position or an "off" position. The electrostatic force can counter the elastic restoring force to hold the mirror plate at the "on" position or the "off" position. The un-tilted position can be different from the "on" position and the "off" position. In some embodiments, the un-tilted position can also be the same as the "on" or the "off" positions. The mirror plate 110 can tilt in one direction from the un-tilted position to a tilt angle $\theta_{on}$ relative to the substrate 300. The mirror plate 110 can reflect an incident light 330 to form reflected light 340 traveling in the "on" direction such that the reflected light 340 can arrive at a display area to form display image. The "on" direction is typically perpendicular to the substrate 300. Since the incident angle (i.e., the angle between the incident light 330 and the mirror normal direction) and the reflection angle (i.e. the angle between the reflected light 340 and the mirror normal direction) are the same, the incident light 330 and the reflected light 340 form an angle $2\theta_{on}$, that is twice as large as the tilt angle $\theta_{on}$ of the mirror plate 110.

Referring to FIG. 4B, the mirror plate 110 can symmetrically tilt in the opposite direction to an orientation also at a tilt angle $\theta_{on}$ relative to the substrate 300. The mirror plate 110 can reflect the incident light 330 to form reflected light 345 traveling in the "off" direction. The reflected light 345 can be blocked by an aperture (530 in FIGS. 5-7) and absorbed by a light absorber. Because the incident angle for the incident light 330 is $3\theta_{on}$, the reflection angle should also be $3\theta_{on}$. Thus the angle between the reflected lights 340 in the "on" and the "off" directions is $4\theta_{on}$, four times as large as the tile angle $\theta_{on}$ of the mirror plate 110.

Figure 5:
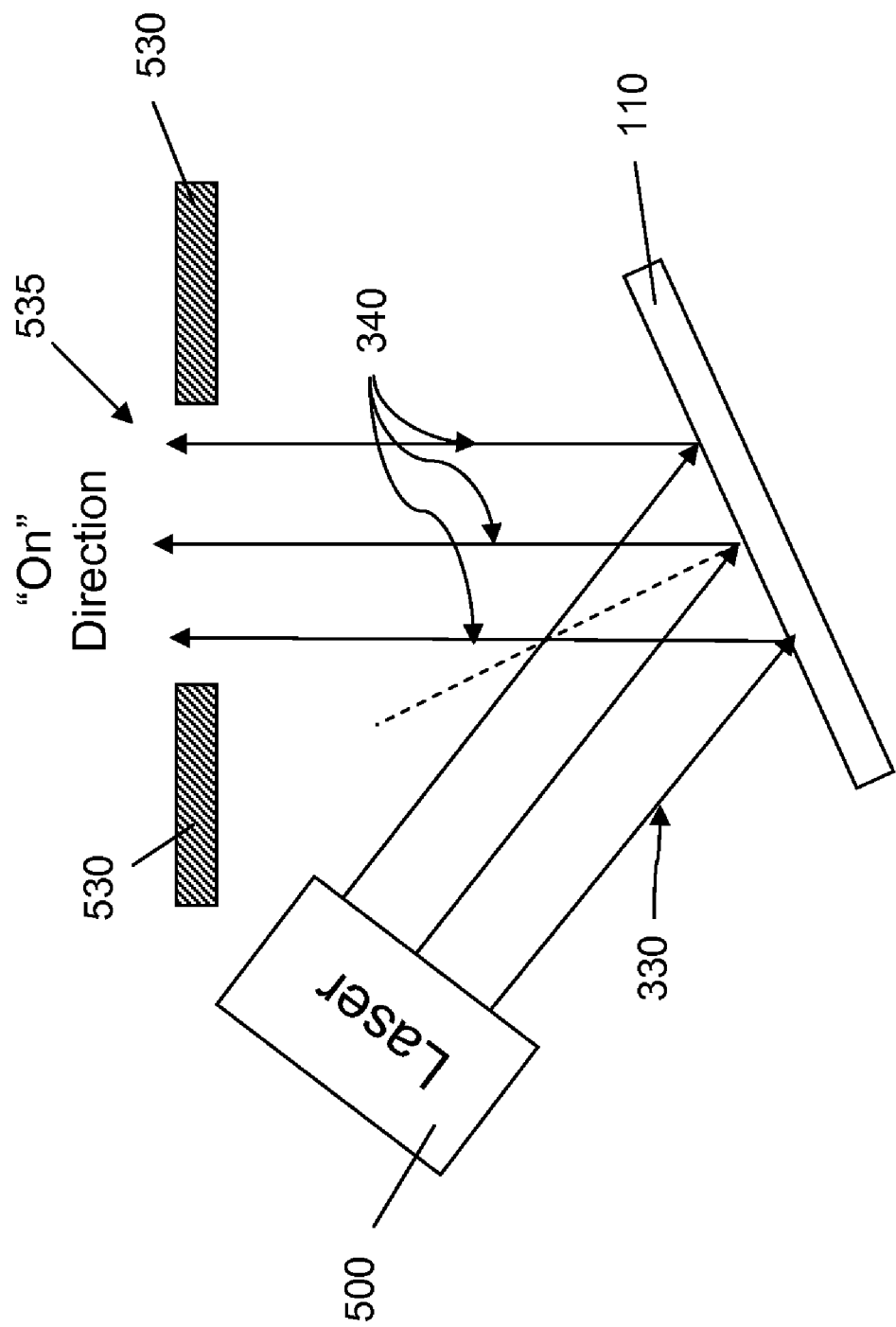
FIG. 5 illustrates the reflection of a laser-emitted incident light by a tilted mirror plate.
Figure 6:
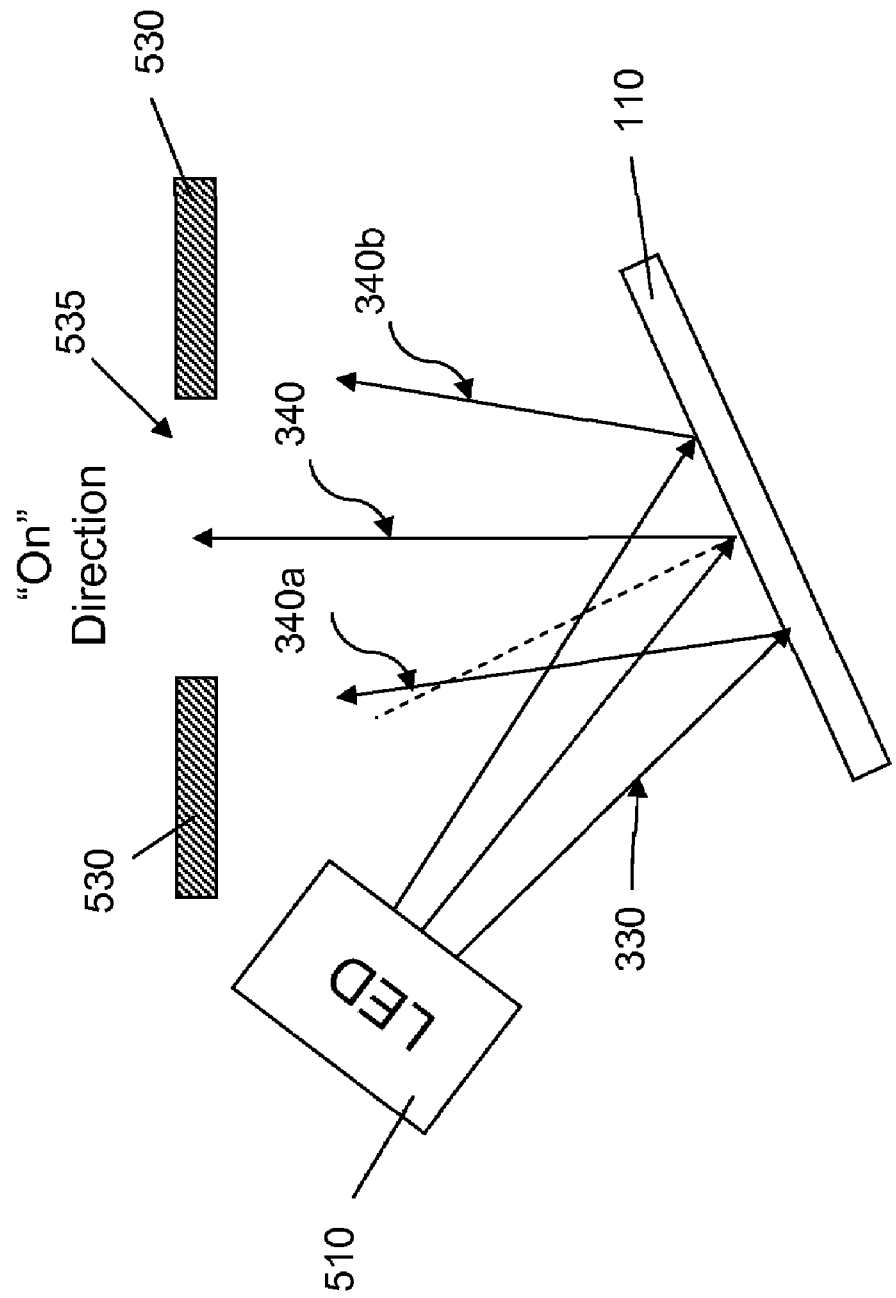
FIG. 6 illustrates the reflection of a light-emitting-diode emitted incident light by a tilted mirror plate.

The incident light 330 can be provided by different light sources, such as a laser 500 or light emitting diode (LED) 510, as respectively shown in FIGS. 5 and 6. The incident light emitted by the laser 500 is coherent and can remain collimated after the reflection by the mirror plate 110. An aperture 530, the laser 500, and the mirror plate 110 can be arranged such that almost all the reflected light 340 reflected by the mirror plate 110 when tilted in the "on" direction passes through an opening 535 in the aperture 530. The incident light 330 emitted from the LED 510 is generally non-coherent and tends to diverge over distance. The aperture 530, the LED 510, and the mirror plate 110 can be arranged such that a majority of the light reflected by the mirror plate 110 at the "on" position passes through the opening 535 in the aperture 530. For example, the reflected light 340 can go through the opening 535, while the reflected light 340a and 340b, which diverges away from reflected light 340 is blocked by the aperture 530.

Figure 7:
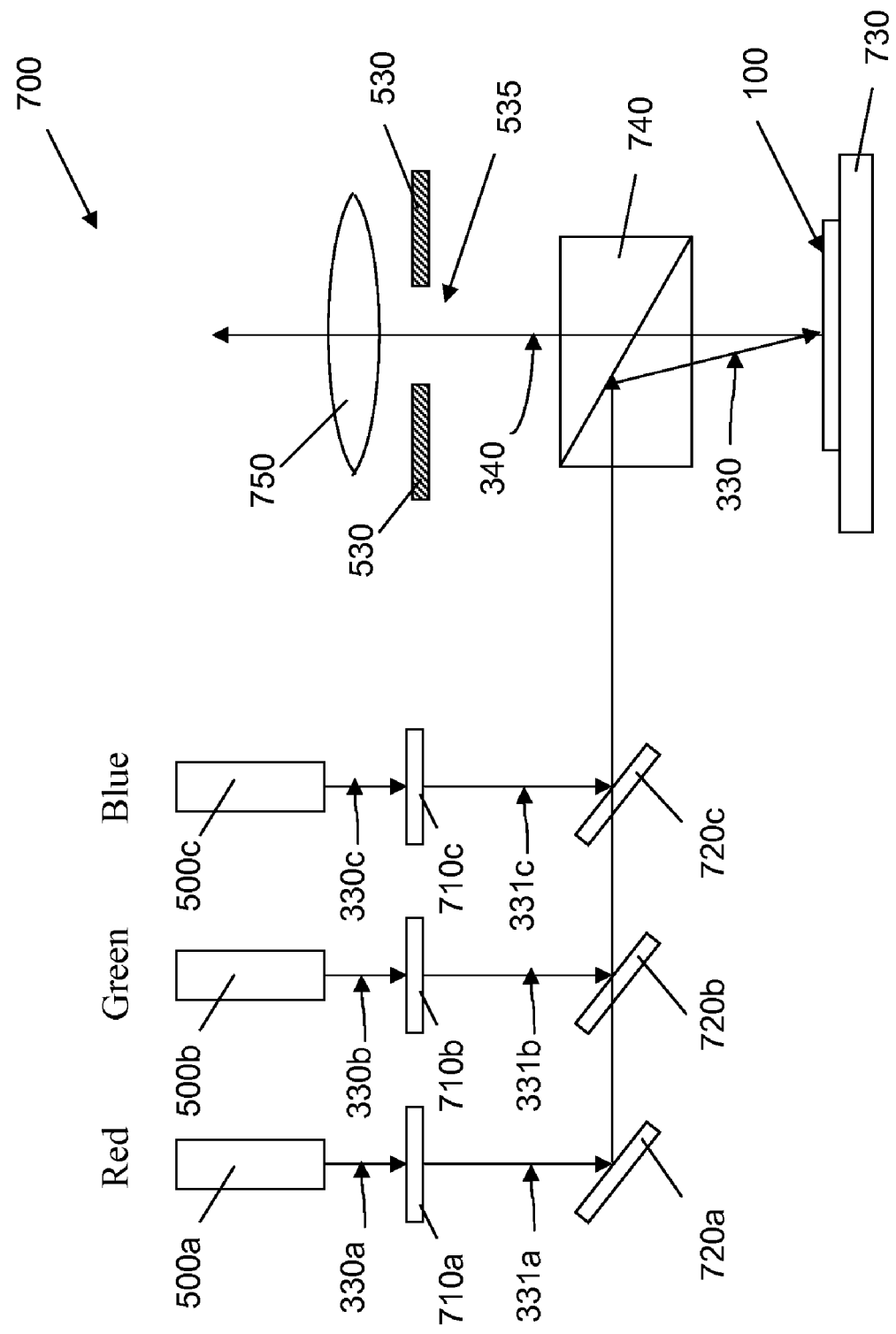
FIG. 7 illustrates an arrangement of an image projection system including micro mirrors.

An exemplary image projection system 700 based on an array of micro mirrors 100 is shown in FIG. 7. Red, green, and blue lasers 500a, 500b and 500c can respectively emit red, green, and blue colored laser beams 330a, 330b, and 330c. The red, green, and blue colored light 330a, 330b, and 330c can pass through diffusers 710a, 710b, and 710c to form colored light 331a, 331b, and 331c. The diffusers 710a, 710b, and 710c can resize (e.g. expand) and can shape the laser beams 330a, 330b, and 330c to cross-sectional shapes that are compatible with the array of micro mirrors 100. For example, the colored light 331a, 331b, and 331c can be shaped to be rectangular, which can be more compatible with the shape of the array of micro mirrors 100. The colored light 331a, 331b, and 331c can then be reflected by beam splitters 720a, 720b, and 720c (which function as beam combiners), and merged into a color incident light 330. The color incident light 330 can be reflected by a total internal reflection (TIR) prism 740 to illuminate micro mirrors 100 on a support member 730. The reflected light 340 deflected by the mirror plates 110 at the "on" positions can pass through the TIR prism 740 and the opening 535 of the aperture 530, and to be projected by a projection system 750 to form a display image.

The relative locations of the aperture 530, the TIR prism 740, and the micro mirror 100 can be arranged such that almost all the reflected light 340 in the "on" direction can pass the opening 535 and all the reflected light 345 in the "off" direction can be blocked by the aperture 530. Any portion of the reflected light 340 blocked by the aperture 530 is a loss in the display brightness. Any stray reflected light 535 that passes through the opening 535 will decrease the contrast of the display image. The larger the angular spread between the reflected light 340 and the reflected light 345, the easier it is to separate the reflected light 340 and the reflected light 345 to achieve the maximum brightness and contrast in the display image. In other words, the larger the tilt angles $\theta_{on}$ (or $\theta_{off}$) in the display system 700, the easier it is to separate the reflected light 340 and the reflected light 345 such that substantially all the reflected light 345 is blocked and substantially all the reflected light 340 can arrive at the display surface to form the display image.

In some conventional micro mirror devices, the tilt movement of the mirror plates is stopped by the mechanical stops. The "on" and "off" positions of a tiltable mirror plate are defined by the mirror plate's orientations when it is in contact with the mechanical stops. In contrast, the micro mirror 100 does not include mechanical stops that can limit the tilt movement of the mirror plate 110. Rather, the "on" and "off" positions of the mirror plate 110 are controlled by a driving voltage applied to the mirror plate 110 and the two-part electrodes 130a, 131a, 130b, and 131b. For this reason, the disclosed mirror plate 110 can be referred as "non-contact" micro mirrors. The conventional mirror systems that utilize mechanical stops or include a mirror plate that contacts the substrate when in a tilted position can be referred as "contact" micro mirrors.

Figure 8:
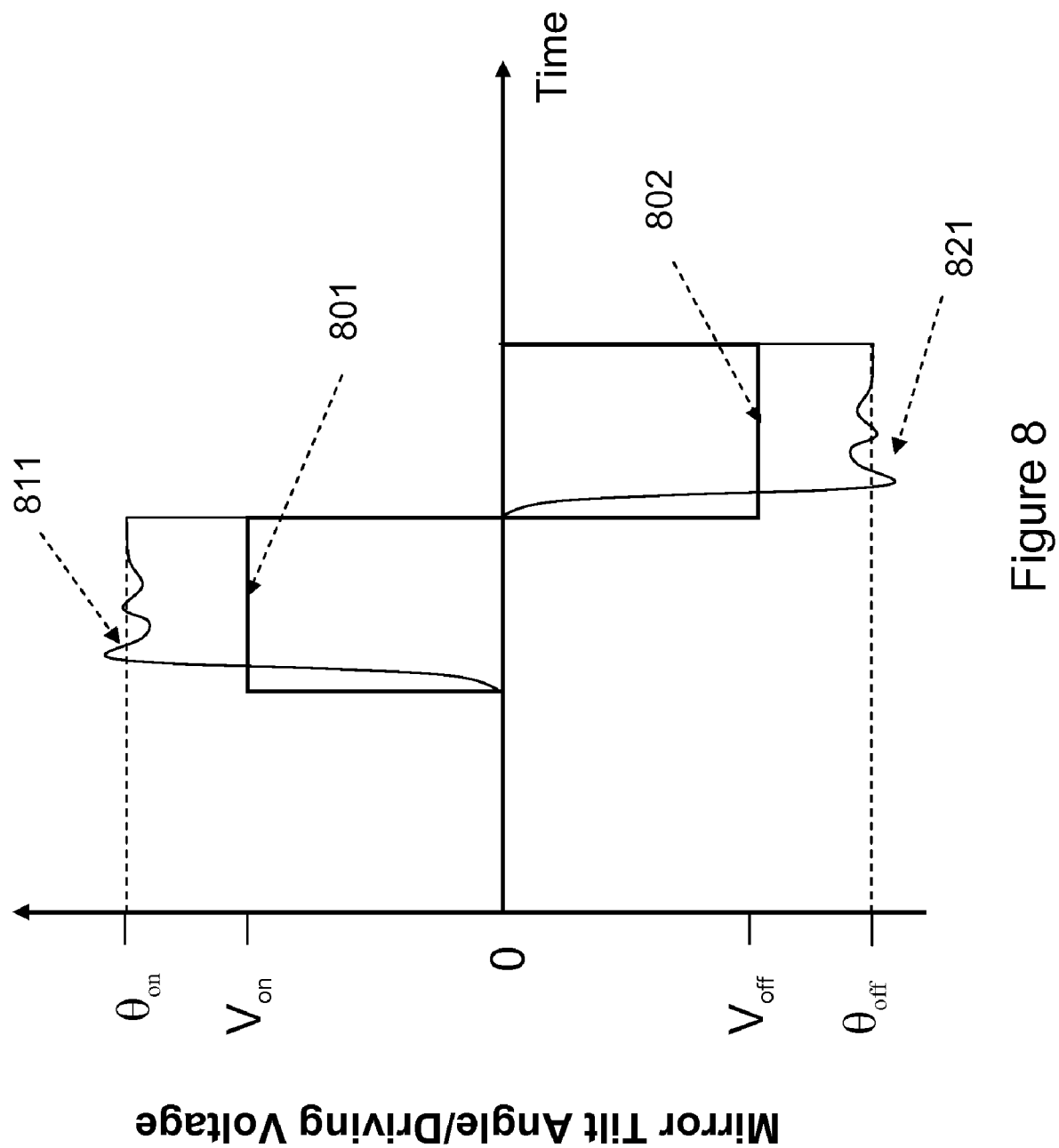
FIG. 8 illustrates the temporal profiles of the driving voltage pulses and the resulting tilt angles in the mirror plate.

A positive driving voltage pulse 801 and a negative driving voltage pulse are shown in FIG. 8. A zero tilt angle corresponds to the horizontal orientation at which the mirror plate 110 is parallel to the surface of the substrate 300. The positive driving voltage pulse 801 includes a driving voltage $V_{on}$, f and is used to control the mirror plate 110 to the "on" position, as shown in FIGS. 3, 4A, 5, and 6. The positive voltage pulse 801 can create an electrostatic force that tilts the mirror plate 110 in the "on" direction, which is a counter clockwise direction in the figures, to a tilt angle $\theta_{on}$ relative to the upper surface of the substrate 300. The mirror plate 110 does not experience any elastic restoring force at the non-tilt state. As the mirror plate 110 tilts, the mirror plate 110 experiences an elastic restoring force, created by the torsional distortion of the elongated hinges 163a or 163b, which applies a force on the mirror plate 110 in the clockwise direction. Although the electrostatic force increases somewhat as the tilt angle increases, the elastic restoring force increases more rapidly as a function of the tilt angle than the electrostatic force. The mirror plate 110 eventually stops at the tilt angle $\theta_{on}$ when the elastic restoring force becomes equal to the electrostatic force. In other words, the mirror plate 110 is held at the tilt angle $\theta_{on}$ by a balance between the electrostatic force and the elastic restoring force that apply forces on the mirror plate 110 in the opposite directions. The mirror plate 110 may initially oscillate around the average tilt angle $\theta_{on}$ in a region 811 and subsequently settle to stay at the tilt angle $\theta_{on}$.

Similarly, a negative driving voltage pulse 802 is used to control the mirror plate 110 to the "off" position, as shown in FIGS. 4B. The voltage pulse 802 includes a driving voltage $V_{off}$. The voltage pulse 802 can create an electrostatic force to tilt the mirror plate 110 in the "off" direction, which is a clockwise direction in the figures, to a tilt angle $\theta_{off}$ relative to the upper surface of the substrate 300. The mirror plate does not experience any elastic restoring force at the non-tilt position. As the tilt angle increases, the elastic restoring force is created by the torsional distortions of the elongated hinges 163a or 163b, which applies a force that is in a counter clockwise direction. The elastic restoring force increases more rapidly as a function of the tilt angle than the electrostatic force. The mirror plate 110 eventually stops at the tilt angle $\theta_{off}$ when the elastic restoring force becomes equal to the electrostatic force. The mirror plate 110 is held at the tilt angle $\theta_{OFF}$ by a balance between the electrostatic force created by the negative voltage pulse 802 and the elastic restoring force by the distorted elongated hinges 163a and 163b. The mirror plate 110 may initially oscillate around the average tilt angle $\theta_{off}$ in a region 821 and then settle to stay at the tilt angle $\theta_{off}$. In the configurations shown in FIGS. 4A and 4B, the tilt angles $\theta_{on}$ and $\theta_{off}$ have equal magnitude. After the negative driving voltage pulse 802 is removed, the mirror plate 110 can be elastically pulled back to zero tilt angle (i.e. the horizontal orientation) by the elongated hinges 163a and 163b.

Figure 9:
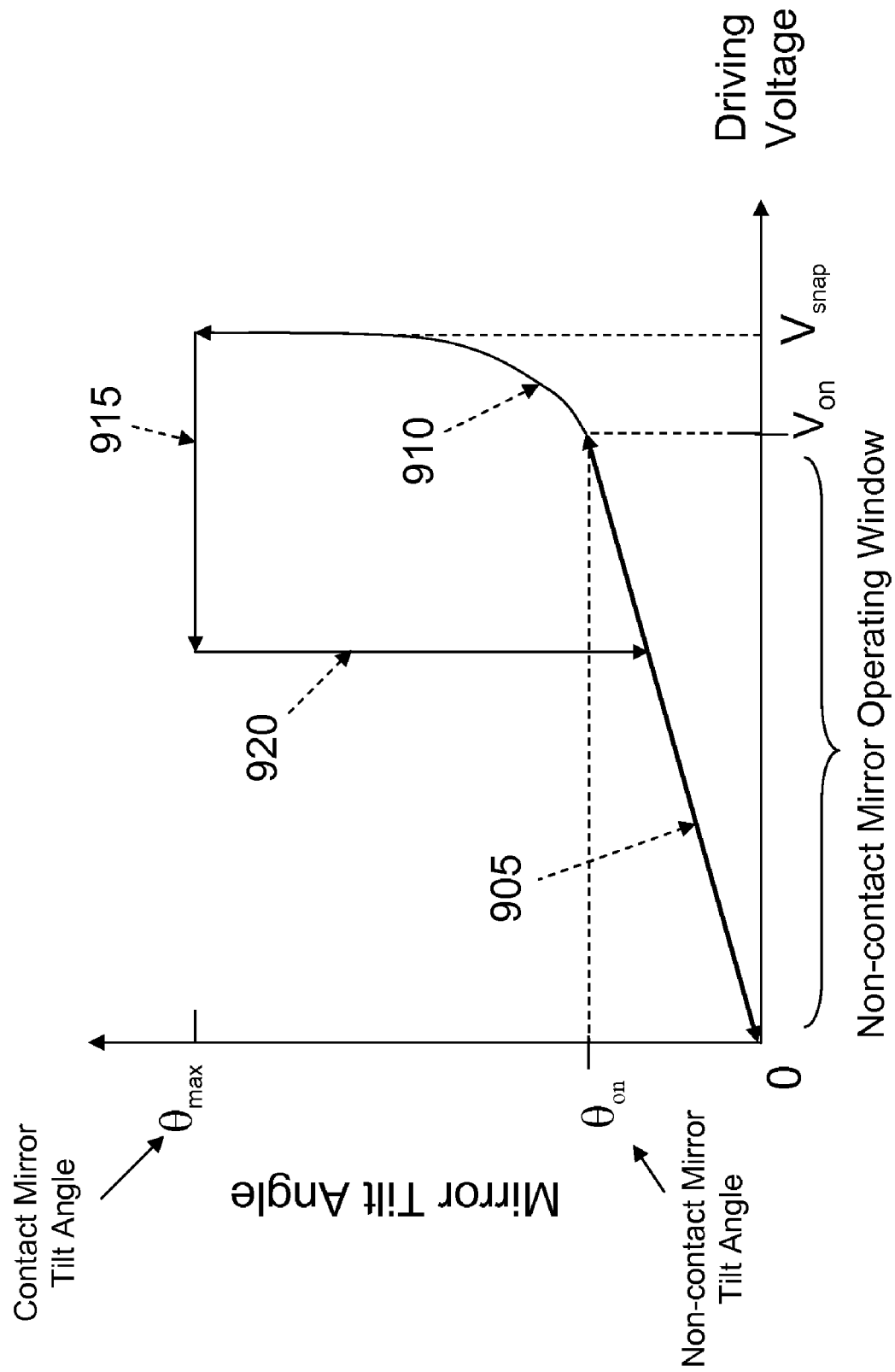
FIG. 9 is a graph illustrating a response curve of the tilt angle of a mirror plate as a function of the driving voltage for contact and non-contact micro mirrors.

A response curve of the tilt angle of a mirror plate as a function of a driving voltage is shown in FIG. 9. The tilt angle of the mirror plate first gradually increases as a function of the driving voltage along a curve 905. The tilt angle then rapidly increases along a curve 910 as the driving voltage increases until the mirror plate "snaps" at a snapping voltage $V_{snap}$ at which the elastic restoring force stops increasing as the tilt angle increases. The electrostatic force continues to increase as the tilt angle increases. The imbalance between the stronger electrostatic force and the constant plastic restoring force (see FIG. 10) sharply increases the tilt angle to $\theta_{max}$ at which the tilt movement of the mirror plate is stopped by a mechanical stop on the substrate. In the present specification, the term "snap" refers to the unstable state of imbalanced mirror plate of the mirror plate wherein the mirror plate rapidly tilts until it is stopped by a fixed object.

Figure 10:
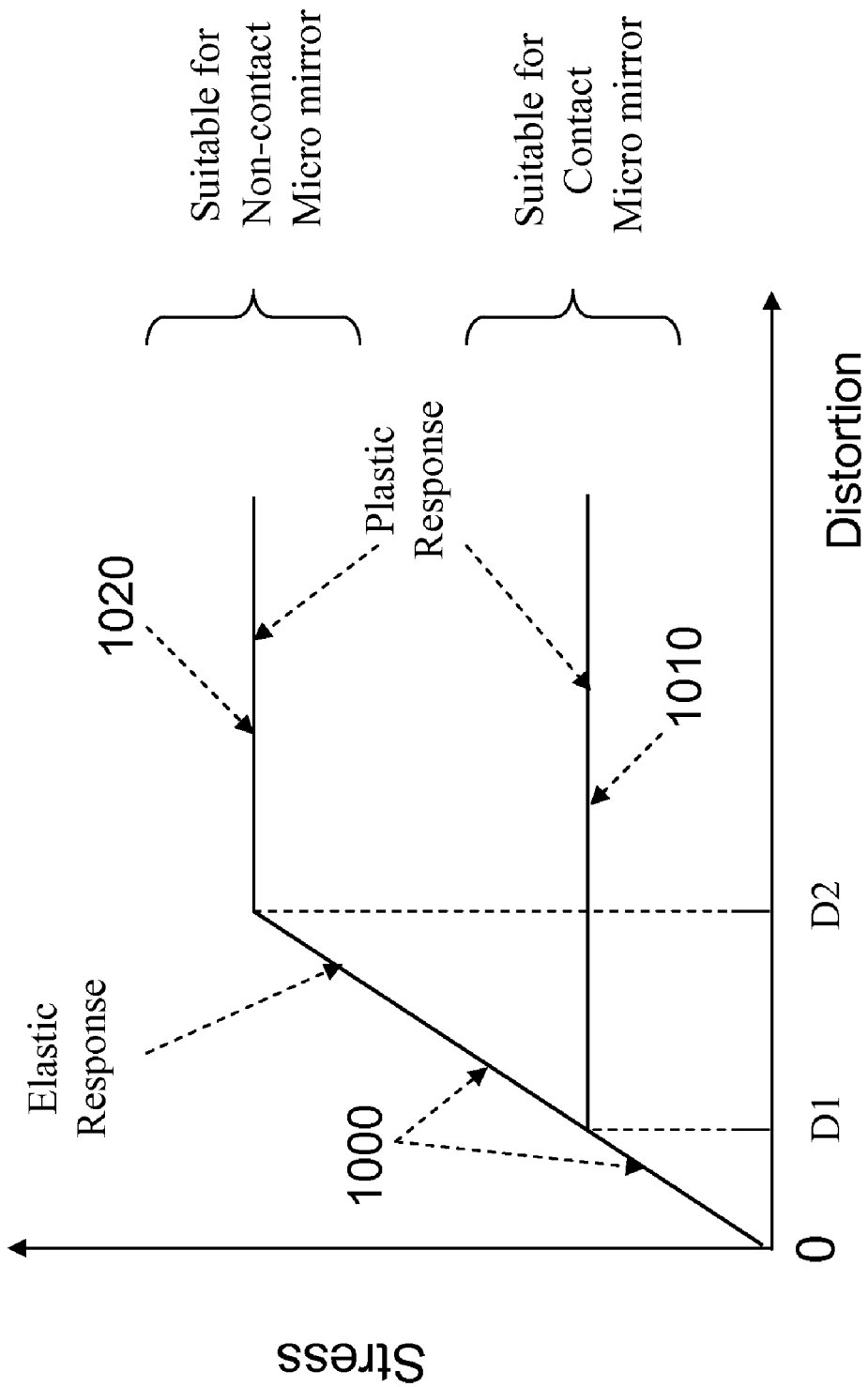
FIG. 10 is a graph illustrating the operation regions of non-contact and contact micro mirrors in a stress-elongation plot.

The "snapping" of the mirror plate is a result of the mechanical properties of the hinge in a micro mirror. Referring to FIG. 10, the stress on a mirror plate can be caused, for example, by an electrostatic force between the mirror plate and an electrode on the substrate. The distortion of a hinge increases with stress along the curve 1000 in the low stress range. The curve 1000 represents the hinge's elastic response to the stress. In one exemplary micro mirror, the hinge snaps at a distortion D1. In other words, the elastic restoring force stops increasing as the tilt angle increase above the tilt angle corresponding to D1. The curve 1010 represents a plastic region of the hinge material.

Figure 12:
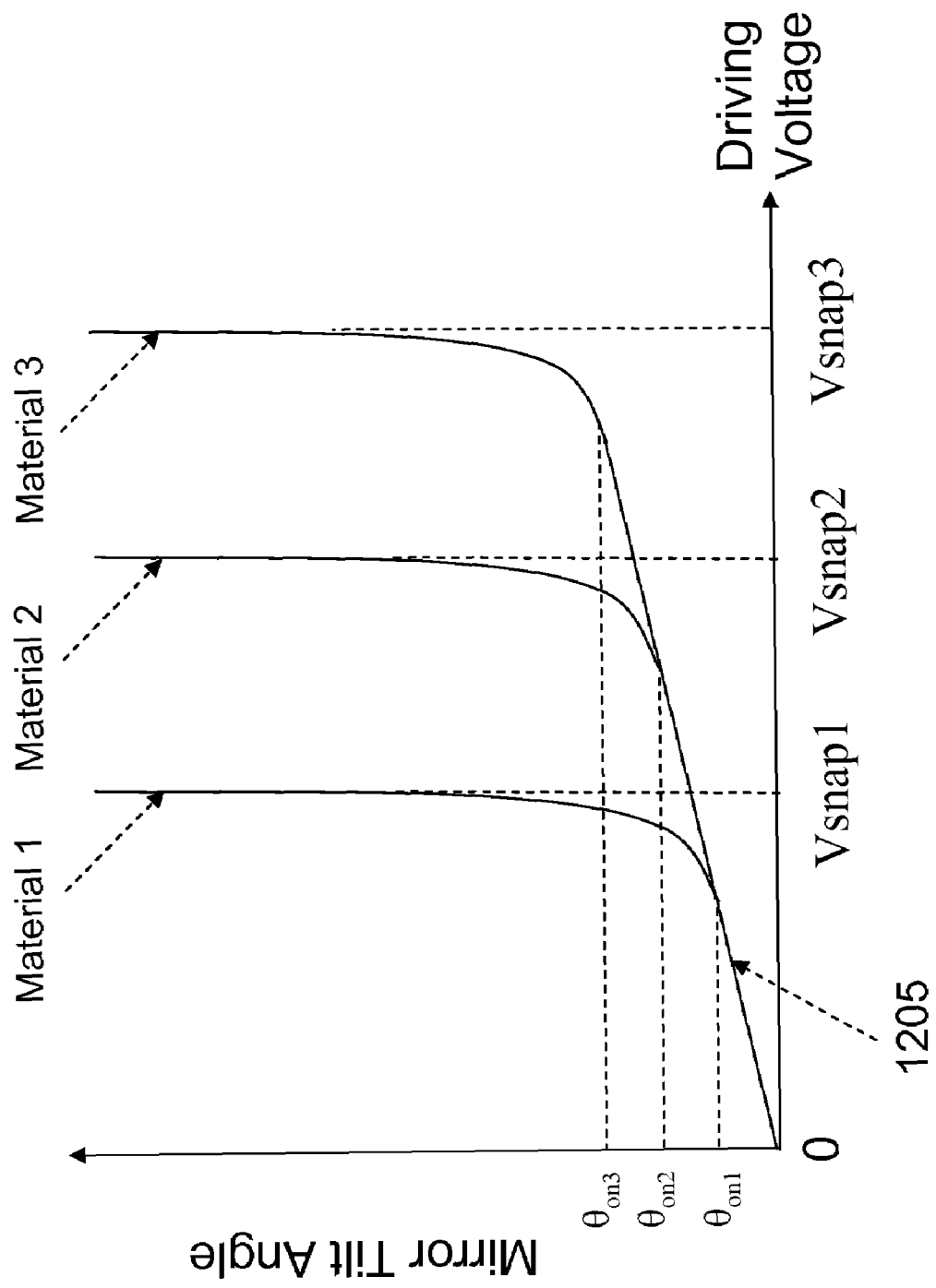
FIG. 12 is a graph illustrating response curves of the mirror-plate tilt angle as a function of the driving voltage for a hinge component having different material compositions.

As discussed previously in relation with FIG. 7, non-contact micro mirrors preferably have large tilt angles such as about 2°, about 3°, about 4°, about 5°, or higher for optimal brightness and contrast in the display images. A large "on" or "off" tilt angle requires a wide angular range in which the mirror plate can be tilted and then can be elastically restored by the hinge back to the non-tilt position. FIG. 10 shows another exemplary micro mirror that transitions from the elastic response curve 1000 to a plastic response curve 1020 at a distortion D2>D1. The micro mirror has a wider range for elastic hinge distortion and is thus more suitable for non-contact mirror applications. The difference between D2 and D1 can result from differences in material compositions of the mirror plate 110 (as shown in FIG. 12). A contact micro mirror, in contrast, can have a narrow range for elastic hinge distortion such that a relatively small driving voltage can snap the mirror plate to cause the plate to contact the mechanical stops. The micro mirror corresponding to the plastic curve 1010 is thus more suitable for a contact micro mirror. One example of a hinge material suitable for the "non-contact" micro mirror in the micro mirror 100 is an aluminum titanium nitride that has a nitrogen composition in the range of about 0 to 15%, or 0 to 10%, and/or approximately equal compositions for aluminum and titanium. One example for the hinge material made of the aluminum titanium nitride compound is $Al_{48\%} Ti_{48\%} N_{4\%}$.

Referring back to FIG. 9, after the micro mirror snaps at the tilt angle $\theta_{max}$, the mirror plate initially stays in contact with the mechanical stop within the drive voltage range indicated by line 915 as the driving voltage decreases. After the hinge returns to an elastic region, restores its elasticity, and can overcome stiction at the mechanical stop, the mirror plate finally tilts back along the response curve 905, where the drive voltage intersects with the line 920. The hysteresis represented by the curves 905 and 910 and lines 915 and 920 is a common property of the contact micro mirrors. The operational window for a non-contact micro mirror is along the curve 905 in the elastic region of the mirror plate. The mirror plate can be tilted and held at a tilt angle $\theta_{on}$ or $\theta_{off}$ by a driving voltage $V_{on}$. The mirror plate can be elastically restored back to the original position by the hinges 163a and 163b along the same the response curve 905 after the electrostatic force is removed. There is no substantial hysteresis associated with the non-contact micro mirror 100 disclosed in the present specification.

Figure 11:
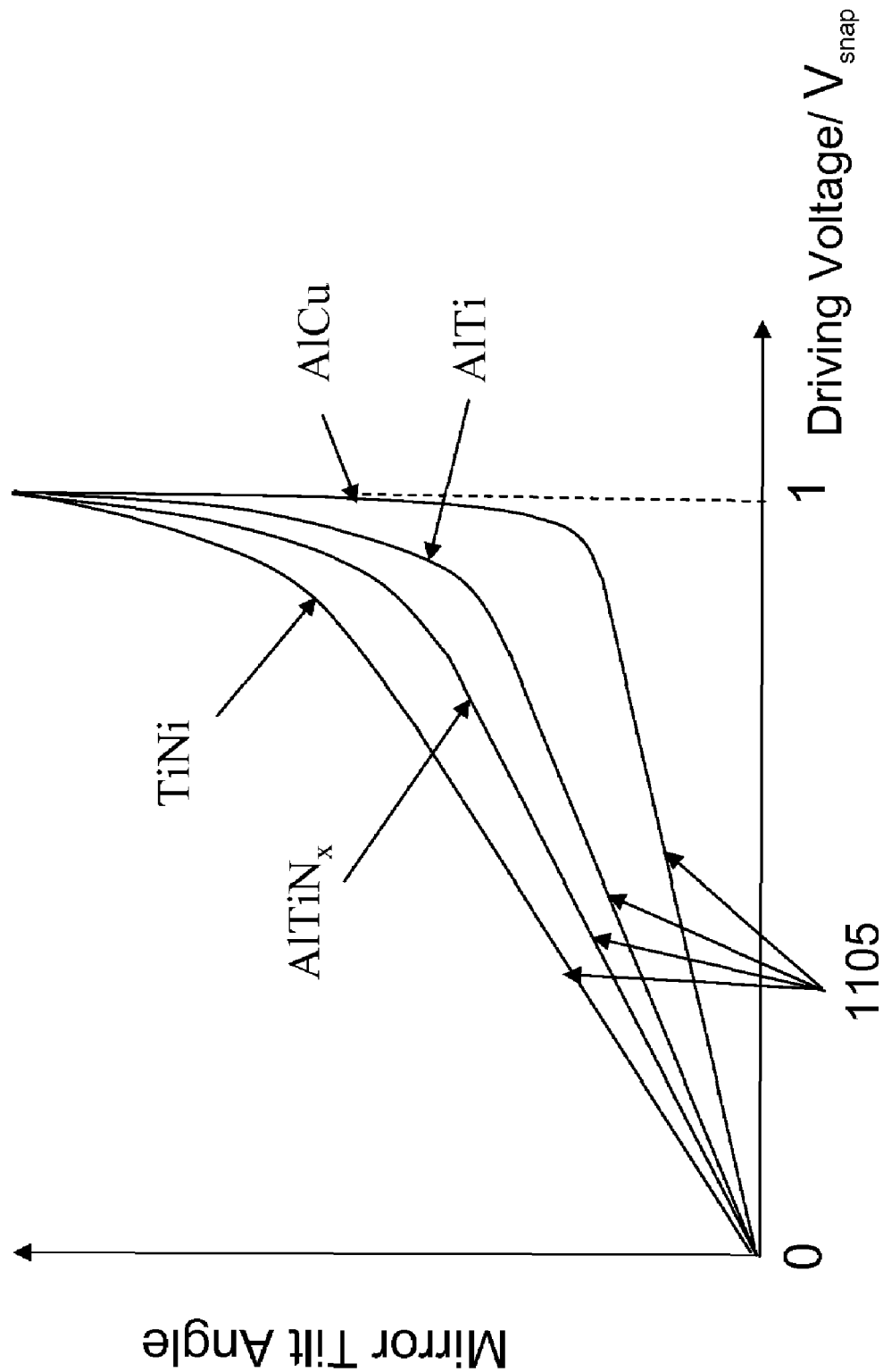
FIG. 11 is a graph illustrating response curves of the mirror-plate tilt angle as a function of a normalized driving voltage for a hinge component having different material compositions.

FIG. 11 illustrates response curves of mirror-plate tilt angle as a function of driving voltage for hinges having different material compositions. The normalized driving voltage is simply the driving voltage divided by the mirror-snapping voltage. The mirror-plate tilt angles for hinges having the different material compositions can rise along different curves 1105 as a function of the normalized driving voltage. The tilt angles are higher for hinges made of an TiNi alloy, an AlTiN compound, and an AlTi alloy than for hinges made of AlCu. The above described hinge materials can include the following exemplified compositions: $Ti_{50\%} Ni_{50\%}$ for the TiNi alloy, $Al_{48\%} Ti_{48\%} N_{4\%}$ for the AlTiN compound, $Al_{50\%} Ti_{50\%}$ for the AlTi alloy, and $Al_{90\%} Cu_{10\%}$ for the AlCu alloy.

As described above, the mirror plates can be tilted in the angular ranges as defined by the cures 1105 and elastically restored to their respective non-tilt positions. The ranges of the tilt angles available for the curves 1105, at which the non-contact micro mirrors operate, are different for the three depicted material compositions. In the particular examples depicted in FIG. 11, a hinge made of $Ti_{90\%} Ni_{10\%}$ allows a non-contact mirror plate to tilt and elastically restore in a wider angular range than the other two hinge material compositions.

The hinge materials compatible with the micro mirror can include a range of materials such as titanium, gold, silver, nickel, iron, cobalt, copper, aluminum, nitrogen, and oxygen. The hinges can be made of TiNi, wherein the titanium composition can be between about 30% and 70%, or between about 40% and 60%, or between about 45% and 55%. The hinges can be made of AlTi, wherein the titanium composition can be between about 30% and 70%, or between about 40% and 60%, or between about 45% and 55%. The suitable hinge material for the "non-contact" micro mirror can also include aluminum titanium nitride that has a nitrogen composition in the range of 0 to 10%, or 0 to 15%, and approximately equal compositions for aluminum and titanium. A hinge composed of aluminum titanium nitride can be substantially free of other elements (in this context, substantially free means that other elements might be present in trace amounts consistent with the fabrication process), and in particular can be substantially free of oxygen.

Referring to FIG. 12, the mirror-plate tilt angles having hinges made of three different materials Material 1, Material 2, and Material 3 may initially gradually rise along the same curve 1205. The snap voltages $V_{snap1}$, $V_{snap2}$ and $V_{snap3}$ for the hinge Material 1, Material 2, and Material 3 may be different: $V_{snap1} < V_{snap2} < V_{snap3}$. The operational windows for non-contact tilt angles $\theta_{on1}$, $\theta_{on2}$, and $\theta_{on3}$ corresponding to the hinge three materials are also different: $\theta_{on1} < \theta_{on2} < \theta_{on3}$. in the examples depicted in FIG. 12, Material 3 is more preferred as the hinge material for the non-contact mirrors because it can provide the largest angular range for the mirror plate's tilt and restoring to the non-tilt position. For example, the hinge made of the Material 3 can elastically restore the mirror plate from a first orientation at or above 2 degrees, 3 degrees, or 4 degrees, relative to the non-tilt position.

The above described micro mirrors provide a simplified structure for a tiltable mirror plate on a substrate and methods for driving the tiltable mirror plate. The tiltable mirror plate can be tilted to and held at predetermined angles in response to electric signals provided by a controller. No mechanical stop is required on the substrate or on the mirror plate to stop the tilted mirror plate and define the tilt angles of the mirror plate. Eliminating mechanical stops not only simplifies a micro mirror device, but also removes the stiction that is known to exist between a mirror plate and mechanical stops in conventional mirror devices. Mirror plate devices described herein may tilt to a narrower angle than mirror plates in conventional devices. Less mirror plate tilting can cause less strain on the hinge around which the mirror plate rotates. Such devices may be less likely to experience mechanical breakdown. Thus, the useful lifetime of the device may be longer. Further, because the hinge is not required to rotate as much as in conventional devices, a greater variety of materials may be selected for hinge formation. Moreover, because the mirror plate undergoes a smaller angular deflection, it can operate at higher frequencies.

It is understood that the disclosed methods are compatible with other configurations of micro mirrors. Different materials than those described above can be used to form the various layers of the mirror plate, the hinge connection post, the hinge support post, the electrodes and the mechanical stops. The electrodes can include several steps as shown in the figures, or a single layer of conductive material. The mirror plate can have different shapes such as, rectangular, hexagonal, diamond, or octagonal. The driving voltage pulses can include different waveforms and polarities. The display system can include different configurations and designs for the optical paths without deviating from the spirit of the present invention. In any instance in which a numerical range is indicated herein, the numerical endpoints can refer to the number indicated or about the number indicated. That is, when a composition has between X and Y % of a component, it can have between X and Y % or in the range of about X to about Y % of the component.

What is claimed is:

1. A micro mirror device, comprising:
   a hinge supported by a substrate;
   a mirror plate tiltable around the hinge, wherein the hinge is configured to produce an elastic restoring force on the mirror plate when the mirror plate is tilted away from an un-tilted position, the elastic restoring force tending to restore the mirror plate to an un-tilted position; and
   a controller configured to produce an electrostatic force in a direction opposing the elastic restoring force to overcome the elastic restoring force to tilt the mirror plate from the un-tilted position to an "on" position or an "off" position and to hold the mirror plate at the "on" position or the "off" position by counteracting the elastic restoring force and without the need for an additional holding electrostatic force.

2. The micro mirror device of claim 1, wherein the hinge is configured to elastically restore the mirror plate to an un-tilted position after the electrostatic force is reduced or removed.

3. The micro mirror device of claim 1, further comprising an electrode on the substrate, wherein the controller is configured to apply a voltage to the electrode to produce the electrostatic force.

4. The micro mirror device of claim 1, wherein the mirror plate is substantially parallel to an upper surface of the substrate when in the un-tilted position.

5. The micro mirror device of claim 1, wherein the tilt angle at the "on" position or the "off" position is at or above 3 degrees relative to the un-tilted position.

6. The micro mirror device of claim 5, wherein the tilt angle at the "on" position or the "off" position is at or above 4 degrees relative to the un-tilted position.

7. The micro mirror device of claim 1, wherein the un-tilted position is different from the "on" position and the "off" position.

8. The micro mirror device of claim 1, wherein the un-tilted position is the same as one of the "on" position or the "off" position.

9. The micro mirror device of claim 1, wherein the hinge comprises a material selected from the group consisting of a titanium-nickel alloy having a titanium composition between about 30% and 70%, a titanium-aluminum alloy having a titanium composition between about 30% and 70%, an aluminum-copper alloy having a copper composition between about 5% and 20%, and aluminum titanium nitride having a nitrogen composition in the range of about 0 and 15%.

10. A micro mirror comprising:
    a hinge supported by a substrate, wherein the hinge comprises material selected from the group consisting of a titanium-nickel alloy having a titanium composition between about 30% and 70%, a titanium-aluminum alloy having a titanium composition between about 30% and 70%, an aluminum-copper alloy having a copper composition between about 5% and 20%, and aluminum titanium nitride having a nitrogen composition in the range of about 0 and 15%;
    a mirror plate tiltable around the hinge, wherein the hinge is configured to produce an elastic restoring force on the mirror plate when the mirror plate is tilted away from an un-tilted position; and
    a controller configured to produce an electrostatic force to overcome the elastic restoring force to tilt the mirror plate from the un-tilted position to an "on" position or an "off" position, wherein the electrostatic force is configured to counter the elastic restoring force to hold the mirror plate at the "on" position or the "off" position.

11. A micro mirror device comprising:
    a hinge supported by a substrate wherein the hinge comprises a material selected from the group consisting of a titanium-nickel alloy having a titanium composition between about 30% and 70%, and an aluminum-copper alloy having a copper composition between about 5% and 20%,
    a mirror plate tiltable around the hinge; and
    a controller configured to produce an electric signal to hold the mirror plate at a titled orientation at or above 2 degrees relative to the surface of the substrate without causing the mirror plate to contact any structure on the substrate other than the hinge, wherein the hinge is configured to elastically restore the mirror plate to be substantially parallel to the substrate from the tilted orientation.

12. The micro mirror device of claim 11, wherein the hinge comprises the titanium-nickel alloy and the titanium composition in the titanium-nickel alloy is between about 40% and 60%.

13. The micro mirror device of claim 11, wherein the hinge comprises the titanium-nickel alloy and the titanium composition in the titanium-nickel alloy is between about 45% and 55%.

14. A method for controlling the tilt movement of a mirror plate, comprising:
    producing an electrostatic force on a mirror plate tiltable around a hinge supported by a substrate, wherein the hinge is configured to produce an elastic restoring force on the mirror plate when the mirror plate is tilted away from an un-tilted position, the elastic restoring force tending to restore the mirror plate to an un-tilted position;
    overcoming the elastic restoring force to tilt the mirror plate from the un-tilted position to a tilted "on" position or an "off" position; and
    maintaining the electrostatic force to hold the mirror plate at the "on" position or the "off" position with the electrostatic force in balance with the elastic restoring force, the electrostatic force thereby counteracting the elastic restoring force to hold the balance without the need for an additional holding electrostatic force.

15. The method of claim 14, wherein the tilt angle at the "on" position or the "off" position is at or above 2 degrees relative to the un-tilted position.

16. The method of claim 14, wherein the tilt angle at the "on" position or the "off" position is at or above 3 degrees relative to the un-tilted position.

17. The method of claim 14, wherein the tilt angle at the "on" position or the "off" position is at or above 4 degrees relative to the surface of the substrate.

18. The method of claim 14, further comprising:
reducing or removing the electrostatic force, thereby allowing the elastic restoring force to elastically restore the mirror plate to the un-tilted position after the electrostatic force is reduced or removed.

19. The method of claim 14, wherein the un-tilted position is substantially parallel to an upper surface of the substrate.

20. The method of claim 14, wherein the un-tilted position is different from the "on" position and the "off" position.

21. The method of claim 14, wherein the un-tilted position is the same as one of the "on" position and the "off" position.

22. A micro mirror device, comprising: a hinge supported by a substrate wherein the hinge comprises a material selected from the group consisting of a titanium-nickel alloy having a titanium composition between about 30% and 70%, a titanium-aluminum alloy having a titanium composition between about 30% and 70%, an aluminum-copper alloy having a copper composition between about 5% and 20%, and aluminum titanium nitride having a nitrogen composition between about 0 and 15%; a mirror plate tiltable around the hinge, the hinge providing an elastic restoring force when the mirror plate is tilted; and a controller configured to produce an electric signal to hold the mirror plate at a titled orientation at or above 2 degrees relative to the surface of the substrate without causing the mirror plate to contact any structure on the substrate other than the hinge, the elastic restoring force tending to elastically restore the mirror plate to be substantially parallel to the substrate, the electric signal holding the mirror plate at the tilted orientation by counteracting the elastic restoring force and without the need for any additional holding electrostatic force.

23. The micro mirror device of claim 22, wherein the hinge comprises the aluminum titanium nitride and the aluminum and the titanium in the aluminum titanium nitride have approximately equal compositions.

24. The micro mirror device of claim 22, wherein the hinge comprises the aluminum titanium nitride and the nitrogen composition in the aluminum titanium nitride is between about 0 and 10%.

25. The micro mirror device of claim 22, wherein the hinge comprises the titanium-nickel alloy and the titanium composition in the titanium-nickel alloy is between about 40% and 60%.

26. The micro mirror device of claim 22, wherein the hinge comprises the titanium-nickel alloy and the titanium composition in the titanium-nickel alloy is in between about 45% and 55%.

27. The micro mirror device of claim 22, wherein the hinge comprises the titanium-aluminum alloy and the titanium composition in the titanium-aluminum alloy is between about 40% and 60%.

28. The micro mirror device of claim 22, wherein the hinge comprises the titanium-aluminum alloy and the titanium composition in the titanium-aluminum alloy is between about 45% to 55%.

* * * * *

UNITED STATES PATENT AND TRADEMARK OFFICE
CERTIFICATE OF CORRECTION

| | |
|---|---|
| PATENT NO. | : 7,586,669 B2 |
| APPLICATION NO. | : 11/553886 |
| DATED | : September 8, 2009 |
| INVENTOR(S) | : Shaoher X. Pan |

It is certified that error appears in the above-identified patent and that said Letters Patent is hereby corrected as shown below:

Column 10, Line 23 at Claim 11; replace:
    "and 20%," with
    -- and 20%; --

Column 10, Line 62 at Claim 16; replace:
    "The method of claim 14, wherein the tilt angle at the" with
    -- The method of claim 15, wherein the tilt angle at the --

Column 10, Line 65 at Claim 17; replace:
    "The method of claim 14, wherein the tilt angle at the" with
    -- The method of claim 16, wherein the tilt angle at the --

Column 11, Line 14 at Claim 22; replace:
    "by a substrate wherein the hinge comprises a material" with
    -- by a substrate, wherein the hinge comprises a material --

Signed and Sealed this

Twenty-seventh Day of October, 2009

David J. Kappos
*Director of the United States Patent and Trademark Office*